Figure 1:
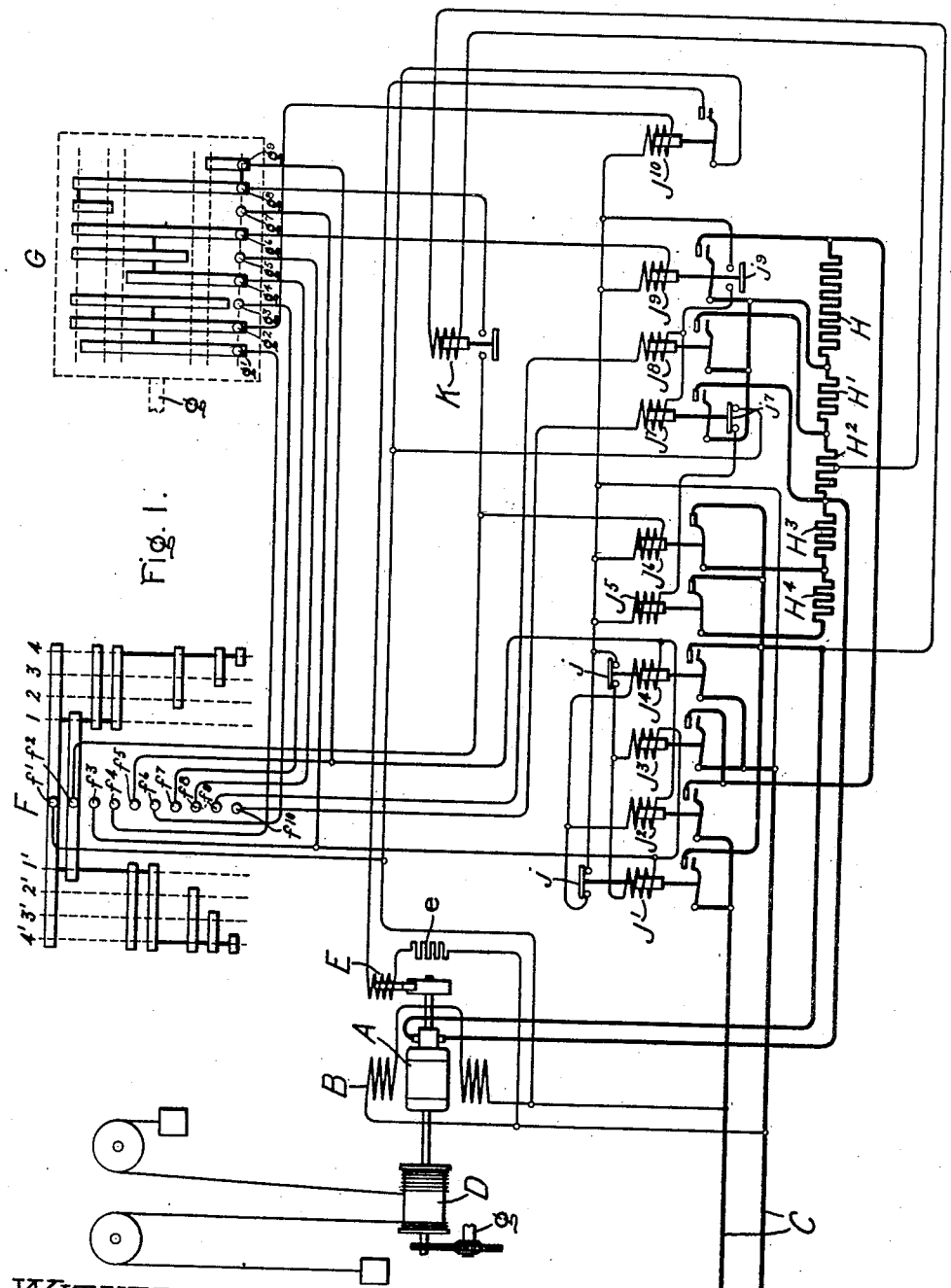

UNITED STATES PATENT OFFICE.

MAXWELL W. DAY, OF SCHENECTADY, NEW YORK, ASSIGNOR TO GENERAL ELECTRIC COMPANY, A CORPORATION OF NEW YORK.

AUTOMATIC MOTOR CONTROL.

1,028,332.  Specification of Letters Patent.  Patented June 4, 1912.

Application filed July 15, 1909. Serial No. 507,843.

*To all whom it may concern:*

Be it known that I, MAXWELL W. DAY, a citizen of the United States, residing at Schenectady, county of Schenectady, State of New York, have invented certain new and useful Improvements in Automatic Motor Control, of which the following is a specification.

My invention relates to the automatic control of electric motors driving loads, such as hoists, elevators, etc., which have a definite limit to their travel. It has been customary to provide such motors with limit switches to open the motor circuit as the load approaches the limit of its travel and sometimes to retard the motor before opening its circuit. If the load varies, the point at which it is brought to rest is not definitely fixed by the limit switches ordinarily employed. With some kinds of loads the motor may run too far after its circuit is opened and with other loads not far enough, or, if the load is brought up against a fixed stop or spring buffer, under certain conditions, the load may not reach the stop, while under other conditions it may strike the stop or buffer too hard. Furthermore, if an automatic mechanical brake is employed to hold the motor from being driven backward by its load after its circuit has been opened and the motor has been brought to rest, it may happen that if the brake is a little slow in acting the load may begin to drive the motor backward before the brake stops the motor.

The object of my invention is to control the motor so that the load is stopped at a given point, regardless of change in the character of the load.

In one aspect, my invention consists in providing a manually operated switch for controlling the supply of current to the motor at starting, and automatic limiting means for first retarding the motor to a predetermined speed and then stopping it without interrupting the supply of current to the motor. By means of this arrangement the motor is first retarded and then positively driven at low speed to the point where it is to be stopped and the supply of current is maintained until the motor is absolutely stopped either by a fixed stop or buffer or by an automatic mechanical brake.

In another aspect, my invention consists in providing, in addition to the limit switch for automatically establishing connections for retarding the motor, automatic means operative upon a predetermined reduction in the motor speed to control the retarding connections to prevent further retardation of the motor speed.

In another aspect, my invention consists in arranging the limit switch for automatically connecting the motor for dynamic braking and providing automatic means responsive to a predetermined reduction in the motor speed for changing the motor connections from braking connections to low speed driving connections, so that the motor positively drives the load at reduced speed until it is finally stopped.

My invention will best be understood by reference to the accompanying drawings, in which—

Figure 2:
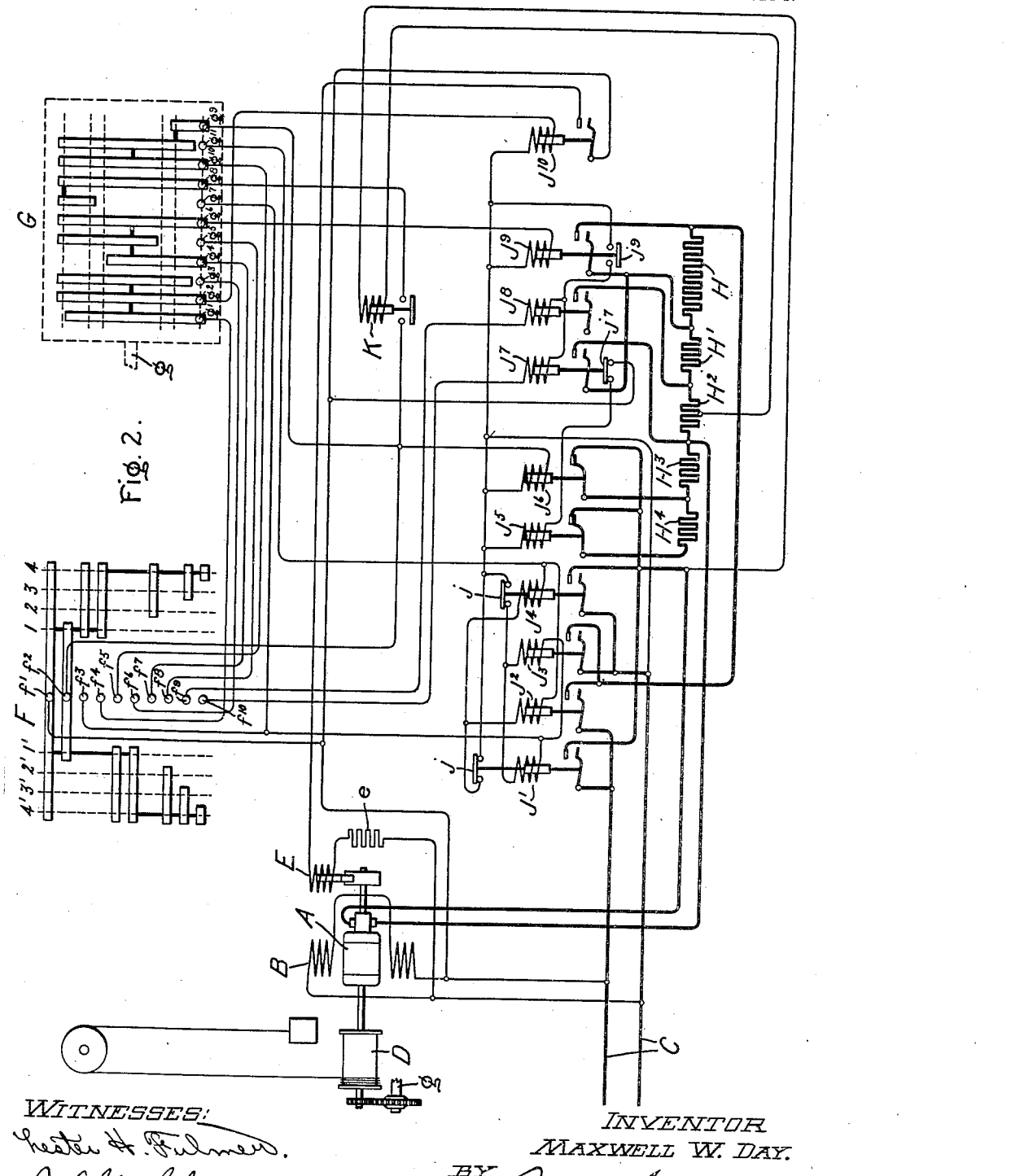

Figure 1 shows my invention applied to the control of a motor driving a balanced hoist or similar load, while Fig. 2 shows it applied to a motor driving an unbalanced hoist or similar load.

In Fig. 1, A represents the motor armature, B the motor field and C the supply conductors. The motor is shown diagrammatically as a shunt wound motor, but it will be understood that my invention is equally applicable to other types. D represents the drum of a balanced hoist driven by the motor. E represents a magnetically actuated friction brake, the winding of which is adapted to be connected across the supply conductors through the resistance $a$. This winding when energized holds the brake shoe out of engagement with the brake wheel, but when deënergized applies the brake to stop the motor. F represents a manually operated master-switch for controlling the supply of current to the motor at starting. This switch has ten stationary contacts $f'$ to $f^{10}$ and movable contacts which are shown developed on a plane surface. The switch has four hoisting positions, indicated by dotted lines 1 to 4, and four lowering positions, indicated by 1' to 4'. G represents an automatic limit switch having stationary contacts $g'$ to $g^9$ and movable contacts which are shown developed on a plane surface. This switch is driven by the hoist through the shaft $g$. H, H' and H² are resistances adapted to be connected in series with the motor armature at starting and also when the motor is being retarded and when operating at low speed. $H^3$ and $H^4$ are resistances adapted to be connected in shunt to the motor armature for dynamic braking and also for weakening the armature current for starting on light loads. $J'$ to $J^{10}$ represent magnetically actuated switches or contactors controlling the motor circuit. The contactors $J'$ to $J^4$ connect and disconnect the motor to and from the supply conductors. The contactors $J'$ and $J^3$ connect the motor for hoisting one load and lowering the other and $J^2$ and $J^4$ for lowering the first load and hoisting the other. These two sets of contactors are interlocked through contacts $j$. Contactors $J^5$ and $J^6$ control the resistances $H^3$ and $H^4$; contactors $J^7$ to $J^9$ control the resistances $H$, $H'$ and $H^2$; and contactor $J^{10}$ controls the magnetic friction brake E. K is a relay having its winding connected in shunt to the armature of the motor so as to respond to variations in the armature voltage and, therefore, to variations in the motor speed.

With the switch F in off position the motor field is excited and a circuit is closed from the upper supply conductor C, through contact fingers $f'$ and $f^2$ of switch F, through the winding of contactor $J^6$ to the lower supply conductor C. A circuit is also closed from the upper supply conductor C, through contact $j^7$ of contactor $J^7$ and the winding of contactor $J^5$ to the lower supply conductor C. Contactors $J^5$ and $J^6$ are, therefore, energized, connecting resistance $H^3$ in shunt to the motor armature, the right-hand terminal of resistance $H^3$ being connected permanently to the lower commutator brush while the left-hand terminal is connected through the contact of contactor $J^6$ to the upper brush. Thus, whenever the switch F is returned to off position, the motor is disconnected from the line and resistance $H^3$ is connected in shunt to the armature to cause the motor to act as a dynamic brake. For hoisting, the switch F is moved first to the position indicated by the dotted line 1. A circuit is then closed from the upper conductor C, through contact fingers $f'$ and $f^3$, through contactor coils $J'$ and $J^3$ in parallel, contact $j$ of contactor $J^4$ to the lower supply conductor. Another circuit is closed from the upper supply conductor C through contact fingers $f'$ and $f^4$, contact fingers $g'$ and $g^2$ of the limit switch and the winding of contactor $J^{10}$ to the lower supply conductor. The circuit last traced closes the circuit of the brake winding E and releases the friction brake, while the circuit first traced, by closing contactors $J'$ and $J^3$, connects the motor armature to the line through resistances H, $H'$ and $H^2$. This circuit may be traced from the upper supply conductor, through contact of contactor $J'$, through the motor armature to the left-hand terminal of resistance $H^2$ through resistance $H^2$, $H'$ and H, through contact of contactor $J^3$ to the lower supply conductor C. The resistance $H^3$ remains in shunt to the motor armature in this first low speed position of the controller F. In passing to the second position, indicated by dotted line 2, the circuit of contactor $J^6$ is broken at finger $f^2$ so that resistances $H^3$ and $H^4$ in series are connected across the armature terminals, so that the current diverted from the armature is reduced; at the same time a circuit is closed through contact finger $f^7$ and contacts $g^4$ and $g^6$ on the limit switch through contactor winding $J^9$. This contactor short-circuits resistance H so as to increase the motor speed. In the third hoisting position of the switch F, a circuit is closed through contact finger $f^9$ and contactor winding $J^8$ and contact $j^9$. Contactor $J^8$ short-circuits resistance $H'$ further increasing the motor speed. In the fourth and last hoisting position the circuit is closed through contact finger $f^{10}$, contactor $J^7$ and contact $j^9$ of contactor $J^9$. Contactor $J^7$ short-circuits resistance $H^2$ so that the motor armature is now directly across the line. At the same time contact $j^7$ opens the circuit of contactor $J^5$ so as to disconnect resistances $H^3$ and $H^4$ from the motor armature. The relay K connected in shunt to the motor armature has picked up before this time but produces no result, since the circuit of its contact is open at the limit switch. No further change occurs until the circuit of contact finger $g^4$ on the limit switch opens, which occurs when the contact fingers are in the position indicated by the third dotted line from the top. When this occurs, contactor coil $J^9$ is open-circuited and opens its contacts inserting resistance H in series with the motor armature and by deënergizing contactors $J^7$ and $J^8$ at contact $j^9$ causes them to insert resistance $H'$ and $H^2$ in series with the motor. Contactor $J^5$ is again energized through contact $j^7$ and again connects resistances $H^3$ and $H^4$ in shunt to the motor armature, so that the motor is somewhat retarded. When the contact fingers of the limit switch reach the position indicated by the second dotted line from the top, contact finger $g^7$ is engaged by its movable contact. This closes the circuit from the upper supply conductor C through contact fingers $f'$, $f^8$, $g^7$, $g^8$, contact of relay K and contactor coil $J^6$ to the lower supply conductor C. This short-circuits resistance $H^4$ so as to connect low resistance $H^3$ in shunt to the motor armature and produces a strong dynamic braking action which effectively retards the motor speed. This braking action continues until the speed and, consequently, the armature voltage of the motor have fallen to a predetermined amount, when relay K opens its contacts, deënergizing contactor J⁶ so as to open the braking connections and thereby leaving the motor connected across the supply conductors with resistance H, H', and H² in series with the motor armature and with resistances H³ and H⁴ in shunt to the armature. The connections are thus changed from high speed connections to low speed driving connections and the load is, therefore, driven positively by the motor until it reaches the desired position when it may be brought up against a fixed stop or stopped by the friction brake. This last operation is performed by the open-circuiting of contact $g'$ on the limit switch which opens the circuit of contactor coil J¹⁰ which deënergized the brake E and applies the friction brake. The current is still kept on the motor so that there is no possibility of the motor being driven backward by the load. After the motor has been finally stopped the manually controlled switch F is returned to "off" position disconnecting the motor from the supply conductors.

The shunt connections of relay K may include, in addition to the motor armature, a portion of resistance H², as shown, so as to impress on the relay a voltage somewhat higher than the armature voltage in order to enable it to hold up its contact until the armature voltage has fallen to a very low value, and to make less difference of voltage at the terminals of relay coil K between the voltage at which it picks up and full speed voltage.

With a balanced load, as shown in Fig. 1, the contacts of the limit switch G are symmetrical. If the load is unbalanced the limit switch may be arranged as in Fig. 2, in which two additional fingers $g^{10}$ and $g^{11}$ are applied to the limit switch between fingers $g^8$ and $g^9$. For hoisting the operation is precisely the same as has been described for Fig. 1, but in lowering the contact $g^{11}$ is open-circuited at the same time that contact finger $g^3$ is open-circuited. The latter finger deënergizes the contactor J¹⁰ to apply the brakes as for hoisting while the finger $g^{11}$ deënergizes contactors J² and J⁴ so as to disconnect the motor from the line. This modification is made, because, with an unbalanced load, the load when lowered tends to drive the motor forward so that there is no danger of the motor being driven backward between the time that the motor current is interrupted and the brake applied. Another reason for disconnecting the motor is to prevent it, if the load brings up against a buffer, from continuing to run so as to slack off the rope.

I do not desire to limit myself to the particular connections and arrangement of parts shown and described, but aim in the appended claims to cover all modifications which are within the scope of my invention.

What I claim as new and desire to secure by Letters Patent of the United States, is,—

1. In combination, an electric motor, a load driven thereby, a limit switch for automatically connecting said motor for dynamic braking, and automatic means responsive to a predetermined reduction in motor speed for changing the motor connections from braking connections to low speed driving connections.

2. In combination, an electric motor, a load driven thereby, a limit switch for automatically connecting said motor for dynamic braking, and an electromagnetically controlled switch responsive to a predetermined drop in the motor armature voltage for changing the motor connections from braking connections to low speed driving connections.

3. In combination, an electric motor, a load driven thereby, a limit switch for automatically establishing connections for retarding the motor, and means operative upon a predetermined reduction in speed for controlling the retarding connections and establishing driving connections.

4. In combination, an electric motor, a load driven thereby, a limit switch for short circuiting the motor armature through a resistance, and automatic means responsive to a predetermined reduction in motor speed for controlling the short circuiting connections and establishing driving connections.

5. In combination, an electric motor, a load driven thereby, a limit switch for automatically establishing connections for retarding the motor, and means responsive to a predetermined reduction in motor speed for controlling the retarding connections and establishing low speed driving connections.

6. In combination, an electric motor, a load driven thereby, automatically operating means for retarding the motor, and means whereby low speed driving connections for said motor are automatically established after the application of the retarding means.

7. In combination, an electric motor, a load driven thereby, a limit switch for automatically establishing connections for retarding the motor, automatic means operative upon a predetermined reduction in motor speed to control said connections to prevent further retardation thereby, and a friction brake for stopping said motor.

8. In combination, an electric motor, a load driven thereby, a limit switch for automatically connecting said motor for dynamic braking, automatic means responsive to a predetermined reduction in motor speed for changing the motor connections from braking connections to low speed driving connections, and an automatically controlled mechanical brake for stopping said motor.

9. In combination, an electric motor, a load driven thereby, a limit switch for automatically connecting said motor for dynamic braking, automatic means responsive to a predetermined reduction in motor speed for changing the motor connections from braking connections to low speed driving connections, and automatic means operative after the establishment of said driving connections for mechanically stopping said motor without breaking the driving connections.

10. In combination, an electric motor, a load driven thereby, a limit switch for automatically connecting said motor for dynamic braking, an electromagnetically controlled switch responsive to a predetermined drop in the motor armature voltage for changing the motor connections from braking connections to low speed driving connections, and automatically controlled mechanical means for stopping said motor without breaking said low speed driving connections.

11. In combination, an electric motor, a load driven thereby, an electrically controlled mechanical brake, a limit switch for inserting resistance in series with the motor armature and connecting the motor for dynamic braking, and means operative upon a predetermined reduction in motor speed for controlling the braking connections to permit the motor to continue running at reduced speed, said limit switch being arranged to control said mechanical brake to apply it after the motor speed has been reduced.

12. In combination, an electric motor, a load driven thereby, a manually controlled switch for controlling the supply of current to the motor at starting, automatic means for dynamically braking the motor to retard the same to a predetermined speed and means for subsequently stopping the motor without interrupting the supply of current thereto.

In witness whereof, I have hereunto set my hand this 14th day of July, 1909.

MAXWELL W. DAY.

Witnesses:
HELEN ORFORD,
THOMAS W. NOONAN.